United States Patent [19]

Sapper et al.

[11] Patent Number: 6,146,707
[45] Date of Patent: Nov. 14, 2000

[54] AQUEOUS COATING AGENT

[75] Inventors: Eckchard Sapper, Rimpar; Christian Schade; Kurt Wendel, both of Ludwigshafen; Hubert Baumgart, Münster, all of Germany

[73] Assignee: BASF Coatings AG, Muenster-Hiltrup, Germany

[21] Appl. No.: 09/381,999

[22] PCT Filed: Mar. 25, 1998

[86] PCT No.: PCT/EP98/01743

§ 371 Date: Sep. 27, 1999

§ 102(e) Date: Sep. 27, 1999

[87] PCT Pub. No.: WO98/44060

PCT Pub. Date: Oct. 8, 1998

[30] Foreign Application Priority Data

Mar. 27, 1997 [DE] Germany .......................... 197 12 940

[51] Int. Cl.⁷ .................. B05D 1/36; B05D 3/02
[52] U.S. Cl. ...................... 427/409; 526/317.1
[58] Field of Search .................. 526/317.1; 427/409

[56] References Cited

U.S. PATENT DOCUMENTS

| 4,719,132 | 1/1988 | Porter, Jr. ........................ 427/409 |
| 5,084,541 | 1/1992 | Jacobs, III et al. ................ 528/45 |
| 5,565,243 | 10/1996 | Mauer et al. ...................... 427/407.2 |
| 5,596,047 | 1/1997 | Wu et al. ........................... 525/375 |

FOREIGN PATENT DOCUMENTS

| 0 089 497 A1 | 2/1983 | European Pat. Off. . |
| 0 256 540 B1 | 10/1992 | European Pat. Off. . |
| 36 28 124 A1 | 8/1986 | Germany . |
| 36 36 183 A1 | 10/1986 | Germany . |
| 10-158548 | 6/1998 | Japan . |
| WO 87/03829 | 7/1987 | WIPO . |
| WO 91/14711 | 10/1991 | WIPO . |
| WO 96/36670 | 11/1996 | WIPO . |
| WO 97/23307 | 7/1997 | WIPO . |

OTHER PUBLICATIONS translation of WO 9636670, Nov. 1996.

*Primary Examiner*—Erma Cameron

[57] ABSTRACT

An aqueous coating composition which comprises as one binder component an aqueous polymer dispersion comprising i) an acrylate polymer based on from 30 to 60% by weight of $C_1$–$C_8$-alkyl (meth)acrylate monomers, from 30 to 60% by weight of vinylaromatic monomers and from 0.5 to 10% by weight of (meth)acrylic acid, (ii) a nonassociative rheology stabilizer comprising an acrylate copolymer based on $C_1$–$C_6$-alkyl (meth)acrylate and (meth)acrylic acid, and (iii) as crosslinker, tris(alkoxycarbonylamino)-triazine or a mixture of tris(alkoxycarbonylamino)-triazines.

20 Claims, No Drawings

AQUEOUS COATING AGENT

This is the national stage of International Application No. PCT/EP98/01743, filed Mar. 25, 1998.

BACKGROUND

1. Field of the Invention

The present invention relates to an aqueous coating composition which comprises as one binder component an aqueous polymer dispersion suitable for application as a basecoat to a substrate surface, to a process for producing a multilayer coating, and to the resulting coating. The aqueous polymer dispersion comprises
(i) an acrylate polymer based on from 30 to 60% by weight of $C_1$–$C_8$-alkyl (meth)acrylate monomers, from 30 to 60% by weight of vinylaromatic monomers and from 0.5 to 10% by weight of (meth)acrylic acid
(ii) a nonassociative rheology stabilizer comprising an acrylate copolymer based on $C_1$–$C_6$-alkyl (meth)acrylate and (meth)acrylic acid, and
(iii) as crosslinker, tris(alkoxycarbonylamino)-triazine or a mixture of tris(alkoxycarbonylamino)-triazines.

2. Discussion of Relevant Art

The prior art discloses processes for coating vehicle bodies, especially automobile bodies, in which the substrate surface is coated in general first with an electrodeposition coating material and/or antistonechip intermediate primer or a filler coat and then, using a coating material comprising at least one pigment, a pigmented basecoat film is applied and this basecoat film is overcoated, if desired, with a transparent coating material. The single-coat or multicoat finish obtained in this way is subsequently stoved or baked.

The basecoat materials used to produce the basecoat film are usually water-based or solvent-based systems. As principal binders they generally comprise polyurethane dispersions or acrylate dispersions, in combination with water-miscible, crosslinkable polyesters and water-miscible melamine resins, which give rise to a series of problems, examples being low storage stability, tendency to yellow, and unstable viscosity.

For ease of processing and a good and uniform appearance of the coated substrate, the pigmented basecoat materials require a pseudoplastic behavior in combination with a certain non-Newtonian behavior. Ease of processing includes, in particular, good sprayability, storage stability, stirring stability, and stability in a closed pipeline circuit. The appearance of the coated substrate is notable for good coverage of sanding spots, a high metallic effect, good adhesion to the substrate and any further coatings applied thereto, water spray resistance, and weathering stability.

Properties of this kind are particularly advantageous, in the case of metallic finishes, for the development of a high metallic effect.

The pseudoplastic behavior and non-Newtonian behavior should be developed fully by the coating materials in particular from a pH of 6 to about 8 in view of the pH values of the binder solutions employed. In order to obtain such properties, it is common to employ thickeners or Theological assistants such as ionic sheet silicates, xanthan gum, diurea compounds, polyurethane thickeners, bentonite, waxes, and wax copolymers.

However, the use of these thickeners does not lead in every case to the desired coating results, and there may also be problems in the course of processing, i.e., in the course of painting.

SUMMARY OF THE INVENTION

An object of the present invention is to provide a coating composition and a process for producing multilayer coatings on a substrate surface, in which crosslinkers and Theological assistants are employed which give the coating composition the desired pseudoplasticity and non-Newtonian behavior and lead to coatings having an outstanding appearance and, in the case of metallic finishes, with a high metallic effect. A further object is to provide coating compositions which can be overcoated with any customary clearcoats.

The present invention accordingly provides an aqueous coating composition which comprises as one binder component an aqueous polymer dispersion comprising
i) an acrylate polymer based on from 30 to 60% by weight of $C_1$–$C_8$-alkyl (meth)acrylate monomers, from 30 to 60% by weight of vinylaromatic monomers and from 0.5 to 10% by weight of (meth)acrylic acid and
(ii) a nonassociative rheology stabilizer comprising an acrylate copolymer based on $C_1$–$C_6$-alkyl (meth)acrylate and (meth)acrylic acid, and
(iii) as crosslinker, tris(alkoxycarbonylamino)-triazine or a mixture of tris(alkoxycarbonylamino)-triazines.

Surprisingly, and in accordance with the invention, it is possible by using a combination of a nonassociative rheology stabilizer, which is an acrylate polymer based on $C_1$–$C_6$-alkyl (meth)acrylate and (meth)acrylic acid, and tris (alkoxycarbonylamino)-triazine as crosslinker, to achieve a marked improvement in the metallic effect and a reduction in the mud cracking. The coating materials of the invention can be overcoated with customary clearcoats, such as 1-component clearcoat based on acrylate/melamine, 1-component clearcoats based on acrylate/melamine/polyurethane, 2-component acrylate/polyurethane clearcoats and also transparent powder coating materials.

DETAILED DESCRIPTION OF THE PRESRENT EMBODIMENTS

Again according to the present invention an aqueous coating composition is provided which comprises as one binder component an aqueous polymer dispersion which includes
i) an acrylate polymer comprising from 30 to 60% by weight of $C_1$–$C_8$-alkyl (meth)acrylate monomers, from 30 to 60% by weight of vinylaromatic monomers and from 0.5 to 10% by weight of (meth)acrylic acid and
(ii) a nonassociative rheology stabilizer comprising an acrylate copolymer which comprises $C_1$–$C_6$-alkyl (meth) acrylate and (meth)acrylic acid, and
(iii) as crosslinker, tris(alkoxycarbonylamino)-triazine or a mixture of tris(alkoxycarbonylamino)-triazines.

As crosslinkers, the coating composition of the invention comprises tris(alkoxycarbonylamino)triazines of the formula

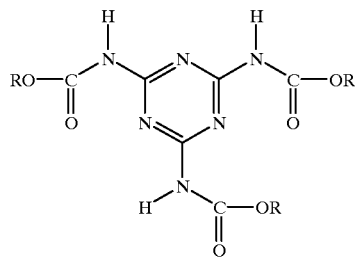

in which R represents $C_1$–$C_6$-alkyl groups, preferably methyl, ethyl, propyl and butyl groups. It is also possible to employ derivatives of said compounds. Preference is given to the use of tris(alkoxycarbonylamino)triazines as are described in U.S. Pat. No. 5,084,541, the disclosure of which is incorporated herein by reference. The crosslinkers of component (iii) can be present in an amount of from 5 to 35% by weight, preferably in an amount from 10 to 20% by weight, based on the solids content of the composition as a whole.

The carbamate groups react preferentially with OH-carriers and, in particular, with hydroxyl groups having as little steric hindrance as possible. Amino groups cannot be crosslinked by the tris(alkoxycarbonylamino)triazine. Instead, there is elimination of the carbalkoxy group.

The acrylate polymer of component (i) employed in accordance with the invention can comprise as its $C_1$–$C_8$-alkyl (meth)acrylate monomer units the linear and branched-chain derivatives, preference being given to methyl (meth) acrylate, ethyl (meth)acrylate, n-propyl and isopropyl (meth)acrylate, n-butyl and isobutyl (meth)acrylate, and 2-ethylhexyl (meth)acrylate. Further monomers present may also be (meth)acrylamide monomers and derivativesthereof.

As vinylaromatic monomers present as monomer units in the acrylate polymer of component (i), mention may be made, for example, of styrene, x-alkyl styrene and vinyltoluene.

The acrylate polymer can be prepared by methods known from the prior art, an example being an emulsion polymerization. The acrylate polymer is preferably employed in the form of a dispersion. During the preparation process, the quantitative ratio between the monomers and the water is preferably established such that the resultant dispersion has a solids content of 30 to 60% by weight, preferably from 35 to 60% by weight, and can be used directly to prepare the coating composition of the invention. One particularly suitable acrylate polymer is obtainable commercially as an aqueous dispersion under the designation Acronal 290 D (BASF AG; Ludwigshafen).

To prepare a dispersion of the acrylate polymer, the emulsifier employed is preferably an anionic emulsifier, alone or in a mixture with others.

Examples of anionic emulsifiers are the alkali metal salts of sulfuric monoesters with alkylphenols or alcohols, and also the sulfuric monoesters of ethoxylated alkylphenols or ethoxylated alcohols, preferably the alkali metal salts of the sulfuric monoester of a nonylphenol, alkyl- or arylsulfonate which has been reacted with from 4 to 5 mol of ethylene oxide per mole, sodium lauryl sulfate, sodium lauryl ethoxylate sulfate, and secondary sodium alkanesulfonates whose carbon chain contains 8- 20 carbon atoms. The amount of anionic emulsifier is from 0.1 to 5.0% by weight, based on the monomers, preferably from 0.5 to 3.0% by weight. In order to increase the stability of the aqueous dispersions it is also possible, in addition, to employ a nonionic emulsifier as the type of an ethoxylated alkylphenol of fatty alcohol, an example being an adduct of 1 mol of nonylphenol from 4 to 30 mol of ethylene oxide, in a mixture with the anionic emulsifier.

The glass transition temperature of the acrylate polymer lies preferably between 15° C. and 35° C., with particular preference between 20° C. and 25° C.

The acrylate polymer employed in accordance with the invention preferably has a number-average molecular mass (determined by gel permeation chromatography using polystyrene as standard) of from 200,000 to 2,000,000, preferably from 300,000 to 1,500,000.

In the coating compositions of the invention, the acrylate polymer is present in an amount which is guided by the respective intended use of the coating compositions of the invention. The amount suitable for the respective intended use can be determined by the skilled worker on the basis of simple preliminary experiments. In accordance with the invention, it is advantageous for the acrylate polymer to be present in an amount of from 1 to 50% by weight, preferably from 2 to 45% by weight and, in particular, from 4 to 40% by weight, based on the solids content in the coating composition of the invention.

As the Theological stabilizer component (ii) in the coating composition use is made, in accordance with the invention, of acrylate copolymers having nonassociative groups, comprising $C_1$–$C_6$-alkyl (meth)-acrylate and (meth)acrylic acid as monomer units. A preferred copolymer comprises as its monomers units (meth)acrylic acid and at least two different $C_1$–$C_6$-alkyl (meth)acrylate monomers. Within the copolymer, the (meth)acrylic acid is preferably present in amounts of from 40% by weight to 60% by weight, with particular preference from 46% by weight to 55% by weight, based on the amount of the overall copolymer. The first $C_1$–$C_6$-alkyl (meth)acrylate monomer is present preferably in amounts of from 30% by weight to 50% by weight, in particular from 36% by weight to 46% by weight, and the second (meth)acrylate monomer in amounts of from 1% by weight to 10% by weight, in particular from 2% by weight to 8% by weight, based in each case on the amount of the overall copolymer. The rheology assistant should give the basecoat composition the desired viscosity, in particular at the pH employed, which is generally alkaline. A particularly preferred rheology stabilizer is one which, if present as a dispersion, is highly mobile and thickens at a neutral or basic pH. The acrylate copolymer is employed suitably in the form of a finished dispersion. As emulsifiers, such dispersions preferably include fatty alcohol alkoxylates, especially $C_8$–$C_{22}$ fatty alcohol ethoxylates. One particularly suitable acrylate copolymer dispersion is obtainable commercially under the designation Viscalex HV 30 (Allied Corporation, Great Britain).

The rheology stabilizer is present in the coating composition of the invention preferably in an amount of from 0.5 to 5.0% by weight, in particular from about 0.3 to 1.5% by weight, based on the solids content. Normally, the rheology stabilizer is employed in the form of a dispersion having a concentration of from 5 to 45% by weight, preferably from 7 to 35% by weight.

The coating composition of the invention can also include further rheology assistants, such as ionic sheet silicates, xanthan gum, diurea compounds, polyurethane thickeners, bentonite, waxes and wax copolymers.

As auxiliary binders the coating composition of the invention may also include epoxy-functional and/or carboxylfunctional constituents, such as customary glycidyl compounds, examples being glycidyl acrylate and glycidyl methacrylate. Examples of suitable carboxyl-functional crosslinkers are carboxylic acids, especially saturated straight-chain aliphatic dicarboxylic acids having 3 to 20 carbon atoms in the molecule, preference being given to the use of dodecane-1,12-dioic acid.

As a further auxiliary binder it is also possible to employ polyvinyl alcohol. It has been found that by the addition of polyvinyl alcohol in an amount of up to 10% by weight, preferably from 1 to 5% by weight, it is possible to improve the compatibility with the topcoat compositions which are applied to the basecoat composition. Polyvinyl alcohol has a solvent-repelling action, so that any solvent or other components present in the topcoat composition is unable, owing to the repelling action of the polyvinyl alcohol, to penetrate into the basecoat composition and alter the color.

As further crosslinkers, it is possible to employ the crosslinkers known in the paint sector, such as melamine resins, which are able to react with free OH groups.

In addition to the polymers described above, the coating compositions of the invention may also include further compatible water-dilutable resins, such as amino resins, polyesters, polyurethanes and acrylated polyurethanes and urethanized acrylates, especially hydroxyl-containing resins, which serve as additives, in particular as crosslinking components for the component (iii) to be used in accordance with the invention, in order to achieve certain technical coatings properties such as adhesion improvement, or which, in general, serve as grinding resins for pigments.

The auxiliary binder and/or further crosslinkers can be employed in an amount of up to 10% by weight, in particular from 0.5 to 10% by weight.

The coating compositions of the invention generally have a solids content of from about 15 to 60% by weight. The solids content varies with the intended use of the coating compositions. For metallic finishes, for example, it is preferably from 12 to 25% by weight. For solid-color paints it is higher: from 14 to 55% by weight, for example.

In order to neutralize the components (i) and (ii) it is possible to employ ammonia and/or amines, especially alkylamines, amino alcohols and cyclic amines, such as diethylamine and triethylamine, aminomethylpropanol, dimethylethanolamine, dimethylaminoethanolamine, diisopropanolamine, morpholine, or an N-alkylmorpholine. Preference is given to highly volatile amines for the neutralization. The aqueous coating composition is usually adjusted to a pH of between 6 and 9, preferably from 7 to 8.5.

The coating composition of the invention can comprise organic solvents in an amount of up to 15% by weight. Examples of suitable organic solvents are naphthalenes, mineral spirits and alcohols. As further liquid components, the basecoat materials of the invention may include alkylene glycols, such as ethylene glycol, propylene glycol, butylene glycol, 1,4-butanediol, 1,6-hexanediol, neopentyl glycol and other diols, such as dimethylolcyclohexane.

As pigments, the coating composition of the invention can include customary pigments employed for painting automobile bodies, examples being effect pigments, and also organic and inorganic coloring pigments.

Examples of suitable effect pigments are commercial aluminum bronzes, the chromated aluminum bronzes of DE-A-36 36 183, commercial stainless steel bronzes, and also other customary metal flakes and metal flake pigments and also nonmetallic effect pigments, such as pearl luster pigments and interference pigments, for example.

Examples of suitable inorganic coloring pigments are titanium dioxide, iron oxides, carbon black and the like. Examples of organic coloring pigments are Indanthrene blue, Cromophthal red, Irgazine orange, Sicotrans yellow, Heliogen green, and the like.

Furthermore, anticorrosion pigments, such as zinc phosphate, for example, may be present.

The coating composition may additionally comprise fillers which are customary in the field of paint chemistry. These include silica, magnesium silicate, talc, bentones, titanium dioxide, and barium sulfate.

The fraction of pigments and fillers in the coating composition of the invention can amount overall to from 3 to 25% by weight, based on the solids content. The pigment can be added in any desired manner: for example, as an aqueous slurry or as a paste. The pigments can be ground, for example, with a grinding resin, such as an auxiliary binder, dispersing auxiliary, or water. In the case of solid-color paints it is preferred to slurry the pigments in dispersing auxiliary and water. Where aluminum or flakes are employed, they are slurried, if desired, in solvent and possibly a mixture of water and wetting agent, or are ground in the principal binder or in another auxiliary binder.

The amount of component (i) can vary depending on the pigment employed. Where the pigments are organic and/or inorganic coloring pigments, the polymer dispersion is present preferably in an amount of 25 to 50% by weight, based on the solids content. Where the pigments are effect pigments, the polymer dispersion is present preferably in an amount of 15 to 30% by weight, based on the solids content.

As a further component, coating composition may comprise film-forming auxiliaries. Suitable film-forming auxiliaries are dialkyl dicarboxylates, 1,2-propylene glycol, high-boiling mineral spirits and naphthalenes which have a boiling point of more than 100° C., preferably more than 140° C.

If desired, the coating composition may also include further auxiliaries and additives. Examples of these are catalysts, assistants, defoamers, dispersing auxiliaries, wetting agents, preferably carboxy-functional dispersants, antioxidants, UV absorbers, free-radical scavengers, leveling agents, biocides and/or water retention agents.

The present invention additionally provides a process for producing a multilayer coating on a substrate surface.

In a first embodiment, the process includes the following stages or steps (A) an aqueous coating formulation which comprises the coating composition described above as film-forming agent is applied as basecoat composition to a substrate surface coated with a customary filler, (B) a suitable transparent topcoat composition or formulation is applied to the resultant basecoat, and (C) the basecoat is stoved or baked together with the topcoat.

Prior to its application to the filler coat, the coating composition of the invention can be admixed, if desired, with water in order to adjust the solids content, with solvent or Theological assistant in order to adjust the performance properties, and, if desired, with a base for regulating the pH. Should the viscosity still not be within the desired range, then it is possible to add further rheology stabilizer (ii) or further thickener, if desired in an amount of from 0.001 to 0.006% by weight, based on the solids content.

The basecoat applied to the substrate in stage (A) is overcoated in stage (B), in accordance with the invention, with a suitable transparent topcoat composition. Prior to the application of the transparent topcoat composition the basecoat coating composition is advantageously allowed to dry by evaporation for a short time, preferably for from 1 to 15 minutes, in particular from 4 to 8 minutes, at a temperature from 60 to 100° C., preferably from 70 to 85° C. The period of evaporation depends on the temperature and can be established over wide ranges.

Particularly resistant multilayer coatings can be obtained if the substrate surface obtained in stage (A) is partially dried prior to the application of the topcoat composition, so that the degree of film formation and/or crosslinking present is sufficient to prevent any water and/or solvent which may be present in the topcoat composition applied in stage (B) from diffusing into the basecoat.

The transparent topcoat composition used can be any customary topcoat. Preference is given to the clearcoats used in the field of paint chemistry, such as, for example, water- or solvent-based clearcoats, transparent powder coating materials, transparent powder slurry coating materials, solventborne and aqueous two-component clearcoats, etc.

The transparent topcoat composition can be applied by customary techniques known in the prior art.

In a second embodiment, a multilayer coating is produced on a substrate surface according to a process including the following steps:

(D) an aqueous basecoat formulation (Y) which comprises an aqueous polymer dispersion as defined above as film-forming agent is applied to a substrate surface coated with an aqueous basecoat formulation (X), (E) a suitable transparent topcoat formulation is applied to the formulation obtained in stage (D) and (F) the basecoat formulations (X) and (Y) are stoved or baked together with the topcoat formulation.

In this process embodiment, the coating composition of the invention in step (D) is applied to a substrate surface coated with an aqueous basecoat formulation (X). The aqueous basecoat formulation (X) used is preferably a coating film formulation comprising a) as binder a water-dilutable polyurethane resin which has an acid number of from 10 to 60 and a number-average molecular weight of from 4000 to 25,000 and can be prepared by reacting with one another aa) a polyester polyol and/or polyether polyol having a number-average molecular weight from 400 to 5000, or a mixture of such polyester polyols and/or polyether polyols, bb) a polyisocyanate or a mixture of polyisocyanates, cc) a compound which has in the molecule at least one group which is reactive toward isocyanate groups and at least one group which is capable of forming anions, or a mixture of such compounds, and, if desired, dd) a hydroxyl- and/or amino-containing organic compound having a molecular weight of from 40 to 400, or a mixture of such compounds, and at least partially neutralizing the resultant reaction product, and also comprises b) pigments and/or fillers, the ratio of binder to pigment being between 0.5:1 and 1.5:1.

For this formulation it is particularly advantageous if a coating film formulation based on a physically drying polyurethane dispersion without polyesters and amino resins is prepared. It has been found that the use of a coating material consisting of only polyurethane resins and pigments leads to a material which is particularly suitable for use as a filler coat and antistonechip intermediate primer coat, since it is unexpectedly stable to mechanical stresses, especially stone chipping and impacts.

The component (a) can be prepared from aa), bb), cc) and, if desired dd) by methods of polyurethane chemistry which are well known to the skilled worker (cf., e.g., U.S. Pat. No. 4,719,132, DE-A-36 28 124, EP-A-89,497, EP-A-256,540 and WO 87/03829). As component (aa) it is possible to employ saturated and unsaturated polyester polyols and/or polyether polyols, especially polyester diols and/or polyether diols having a number-average molecular weight of from 400 to 5000. Suitable polyether diols are, for example, polyether diols of the general formula H(—O—(CHR$^1$)$_n$—)$_m$OH, where R$^1$=hydrogen or a lower, substituted or unsubstituted alkyl radical, n=2 to 6, preferably 3 to 4, and m=2 to 100, preferably 5 to 50. Examples are linear or branched polyether diols, such as poly(oxyethylene) glycols, poly(oxypropylene) glycols and poly(oxybutylene) glycols. The polyether diols selected should not introduce excessive amounts of ether groups, since otherwise the polymers formed swell in water. The preferred polyether diols are poly(oxypropylene) glycols in the molecular mass range M$_n$ from 400 to 3000.

Polyester diols are prepared by esterifying organic dicarboxylic acids or their anhydrides with organic diols, or are derived from a hydroxy carboxylic acid or a lactone. In order to prepare branched polyester polyols, it is possible to employ, to a minor extent, polyols or polycarboxylic acids having a higher functionality. The dicarboxylic acids and diols can be linear or branched aliphatic, cycloaliphatic or aromatic dicarboxylic acids or diols.

The diols used to prepare the polyesters consist, for example, of alkylene glycols, such as ethylene glycol, propylene glycol, butylene glycol, 1,4-butanediol, 1,6-hexanediol, neopentyl glycol and other diols, such as dimethylolcyclohexane. It is also possible, however, to add small amounts of polyols such as trimethylolpropane, glycerol, and pentaerythritol. The acid component of the polyester consists primarily of low molecular mass dicarboxylic acids or their anhydrides having 2 to 30, preferably 4 to 18 carbon atoms in the molecule. Examples of suitable acids are o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid, and/or dimerized fatty acids. Instead of these acids it is also possible to use their anhydrides, where they exist. In the course of the formation of polyester polyols, it is also possible for relatively small amounts of carboxylic acids having 3 or more carboxyl groups, examples being trimellitic anhydride or the adduct of maleic anhydride with unsaturated fatty acids, to be present.

It is also possible to use polyester diols obtained by reacting a lactone with a diol. These are notable for the presence of terminal hydroxyl groups and repeating polyester units of the formula (—CO—(CHR$^2$)$_n$—CH$_2$—O). In this formula, n is preferably 4 to 6 and the substituent R$^2$ is hydrogen or an alkyl, cycloalkyl or alkoxy radical.

The substituents can have up to 18 carbon atoms. Examples are hydroxycaproic acid, hydroxybutyric acid, hydroxydecanoic acid, and/or hydroxystearic acid.

For the preparation of the polyester diols, preference is given to the unsubstituted ε-caprolactone, where n has the value 4 and all substituents R are hydrogen. The reaction with lactone is initiated by low molecular mass polyols, such as ethyl glycol, 1,3-propanediol, 1,4-butanediol and dimethylolcyclohexane. It is also possible, however, to react other reaction components with caprolactone, such as ethylenediamine, alkyldialkanolamines, or else urea.

Further suitable diols of relatively high molecular mass are polylactam diols, which are prepared by reacting, say, ε-caprolactam with low molecular mass diols.

As component bb) it is possible to employ aliphatic and/or cycloaliphatic and/or aromatic polyisocyanates. Examples of aromatic polyisocyanates are phenylene diisocyanate, tolylene diisocyanate, xylylene diisocyanate, biphenylene diisocyanate, naphthylene diisocyanate and diphenylmethane diisocyanate.

Owing to their good stability to ultraviolet light, (cyclo)aliphatic polyisocyanates give rise to products having a low tendency to yellow. Examples of these are isophorone diisocyanate, cyclopentylene diisocyanate, and also products of the hydrogenation of aromatic diisocyanates, such as cyclohexylene diisocyanate, methylcyclohexylene diisocyanate and dicyclohexylmethane diisocyanate. Aliphatic diisocyanates are compounds of the formula OCN—(CR$^3{}_2$)$_r$—NCO, in which r is an integer from 2 to 20, in particular from 6 to 8, and R$^3$, which can be identical or different, represents hydrogen or a lower alkyl radical of 1 to 8 carbon atoms, preferably from 1 to 2 carbon atoms. Examples are trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate and trimethylhexane diisocyanate. Particularly preferred diisocyanates are isophorone diisocyanate and dicyclohexylmethane diisocyanate.

In terms of the functionality of the polyisocyanates, the composition of component bb) must be such that no crosslinked polyurethane resin is obtained. In addition to diisocyanates, component bb) may also include a fraction of polyisocyanates having functionalities of more than two— such as, for example, triisocyanates. Products which have proven suitable as triisocyanates are those which form as a result of trimerization or oligomerization of diisocyanates or as a result of reaction of diisocyanates with polyfunctional OH or NH compounds. These include, for example, the biuret of hexamethylene diisocyanate and water, the isocyanurate of hexamethylene diisocyanate, or the adduct of isophorone diisocyanate with trimethylolpropane. The average functionality can be reduced, if desired, by adding monoisocyanates. Examples of such chain-terminating monoisocyanates are phenyl isocyanate, cyclohexylisocyanate, and stearyl isocyanate.

In order to ensure that the polyurethane resins employed are dilutable in water, it is necessary to incorporate into the polyurethane molecules groups capable of forming anions. The groups capable of forming anions ensure, following their neutralization, that the polyurethane resin can be dispersed stably in water. The polyurethane resin a) should have an acid number of from 10 to 60, preferably from 20 to 35. From the acid number it is possible to calculate the amount of potentially anion-forming groups to be introduced into the polyurethane molecules.

The introduction into the polyurethane molecules of the groups capable of forming anions takes place by way of the incorporation of compounds cc) into the polyurethane molecules, these compounds containing in the molecule at least one group which is reactive toward isocyanate groups and at least one group which is capable of forming anions.

As component cc) it is preferred to employ compounds which contain in the molecule two groups which are reactive toward isocyanate groups. Suitable isocyanate-reactive groups are, in particular, hydroxyl groups, and also primary and/or secondary amino groups. Suitable potentially anion-forming groups are carboxyl groups, sulfonic acids groups and/or phosphonic acid groups, preference being given to carboxyl groups. As component cc) it is possible, for example, to employ alkanoic acids having two substituents on α-carbon atoms. The substituent can be a hydroxyl group, an alkyl group or, preferably, an alkylol group. These alkanoic acids have at least one carboxyl group, generally 1 to 3 carboxyl groups, in the molecule. They have from 2 to about 25, preferably from 3 to 10, carbon atoms. Examples of component cc) are dihydroxypropionic acid, dihydroxysuccinic acid and dihydroxybenzoic acid. A particularly preferred group of alkanoic acids comprises the α,α-dimethylolalkanoic acids of the general formula $R^4$—C $(CH_2QH)_2COOH$, where $R^4$ is a hydrogen atom or an alkyl group having up to about 20 carbon atoms.

Examples of such compounds are 2,2-dimethylolacetic acid, 2,2-dimethylolpropionic acid, 2,2-dimethylolbutyric acid and 2,2-dimethylolpentanoic acid. A particularly preferred dihydroxyalkanoic acid is 2,2-dimethylolpropionic acid. Amino-containing compounds are, for example, α,δ-diaminovaleric acid, 3,4-diaminobenzoic acid, 2,4-diaminotoluenesulfonic acid, and 2,4-diaminodiphenyl ether sulfonic acid.

The polyurethane resins a) which are employed preferably can be prepared, if desired, additionally using hydroxyl- and/or amino-containing organic compounds having a molecular weight of from 40 to 400, or a mixture of such compounds (component dd)). The use of component dd) leads to an increase in the molecular weight of the polyurethane resins. As component dd), it is possible, for example, to employ polyols having up to 20 carbon atoms per molecule, such as ethylene glycol, diethylene glycol, triethylene glycol, 1,2-propanediol, 1,3-propanediol, 1,4-butanediol, 1,2 -butylene glycol, 1,6-hexanediol, trimethylolpropane, castor oil or hydrogenated castor oil, ditrimethylolpropane ether, pentaerythritol, 1,2-cyclohexanediol, 1,4-cyclohexanedimethanol, bisphenol A, bisphenol F, neopentyl glycol, neopentyl glycol hydroxypivalate, hydroxyethylated or hydroxypropylated bisphenol A, hydrogenated bisphenol A, and mixtures thereof.

The polyols are generally employed in amounts of up to 30% by weight, preferably from 2 to 20% by weight, based on the amount of component aa) and dd) employed. As component dd) it is also possible to employ diamines and/or polyamines having primary and/or secondary amino groups. Polyamines are essentially alkylene-polyamines having 1 to 40 carbon atoms, preferably about 2 to 15 carbon atoms. They may carry substituents which have no hydrogen atoms that are reactive with isocyanate groups. Examples are polyamines having a linear or branched aliphatic, cycloaliphatic or aromatic structure and at least two primary amino groups. Diamines which may be mentioned include hydrazine, ethylenediamine, propylenediamine, 1,4-butylenediamine, piperazine, 1,4-cyclohexyldimethylamine, 1,6-hexamethylenediamine, trimethylhexamethylenediamine, methylenediamine, isophoronediamine, 4,4'-diaminodicyclohexylmethane and aminoethylethanolamine. Preferred diamines are hydrazine, alkyl- or cycloalkyldiamines, such as propylenediamine and 1 -amino-3-aminomethyl-2,5,5-trimethylcyclohexane. It is also possible to employ polyamines as component dd) which contain more than two amino groups in the molecule. In such cases, however, it must be ensured, for example, by using monoamines, that no crosslinked polyurethane resins are obtained. Such polyamines which can be used are diethylenetriamine, triethylenetetramine, dipropylenetriamine and dibutylenetriamine. An example of a monoamine is ethylhexylamine.

The preparation of component a) is part of the prior art and is described at length, for example, in U.S. Pat. No. 4,719,132, DE-A- 36 28 124, EP-A-89, 497, EP-A-256, 540 and WO 87/03829.

In order to neutralize component a) it is possible to employ ammonia and/or amine (especially alkylamine), amino alcohols and cyclic amines, such as di- and triethylamine, dimethylaminoethanolamine, diisopropanolamine, morpholine or an N-alkylmorpholine. Highly volatile amines are preferred for the neutralization.

Examples of suitable polyurethanes of the type described are the polyester urethanes which are sold by BASF Coatings AG or BASF Aktiengesellschaft under the brand name Parocryl®, especially the grades AW 51.6 and VP 856604.

It is particularly important to observe the weight ratio of binders to pigments and/or filler. This ratio is preferably between 0.5:1 and 1.5:1. Preferably, the range is between 0.6:1 and 1.2:1.

A pigment and/or filler which has proven suitable is talc. Its proportion in the total amount of pigments and fillers is from 20 to 80% by weight. Preference is given to the range from 30 to 70% by weight.

It is possible, if desired, to add amino resins in small amounts. These amounts should make up no more than 10% by weight, based on the overall amount of the basecoat formulation (X). It is better to remain below 5% by weight. Resins of this kind are well known to the skilled worker and offered by many companies as commercial products. Amino resins are products of the condensation of aldehydes, especially formaldehyde, with, for example, urea, melamine, guanamine and benzoguanamine. The amino resins contain alcohol groups, preferably methylol groups, which are generally partly or, preferably, fully etherified with alcohols. Preference is given to the use of water-dilutable amino resins, especially water-dilutable melamine-formaldehyde resins.

Polyisocyanate crosslinkers may likewise be present in the coating film formulation for the coating formulation (X). The proportions thereof lie generally below 30% by weight, preferably below 10% by weight. The reactivity of the crosslinker is generally lower than 130 degrees Celsius.

The use of the above-described coating formulation (X) permits considerably lower coat thicknesses than do comparable materials in accordance with the prior art. These thicknesses are well below 35 µm, i.e., regularly below 15 µm. Despite this low coat thickness, the stonechip resistance achieved corresponds to that of coat thicknesses of 35 µm or more.

On top of the basecoat formulation (X) it is possible, directly or following an initial drying at about 70° C., to apply the basecoat formulation (Y) which comprises the coating composition of the invention, and, subsequently, a transparent topcoat. The coating obtained in this way is subsequently stoved in a manner known per se, preferably at a temperature of between 130 and 160° C. If the color of the basecoat formulation (X) is matched to that of the basecoat formulation (Y) it may even be possible to reduce the coat thicknesses still further without suffering a loss in quality.

In addition to the abovementioned materials, the basecoat formulation (X) described can comprise all auxiliaries and additives which are known per se in paint technology, as stated for the coating composition of the invention to be used in the basecoat formulation (Y).

Following the application of the basecoat formulation (X) the basecoat formulation (Y) is applied in a manner known per se, for example, by spraying, brushing, dipping, flow coating, knife coating or roller coating to the substrate, such as metal, plastic, wood or glass, for example.

Prior to the application of the coating (X) the basecoat formulation (Y) of the invention can be admixed, if desired, with water in order to adjust the solids content, with solvent or rheological assistant in order to adjust the performance properties, and, if desired, with a base for regulating the pH. Should the viscosity still not be within the desired range, then it is possible to add further rheology stabilizer of component (ii) or further thickener, if desired in an amount of from 0.01 to 0.06% by weight, based on the solids content.

The application of the transparent topcoat formulation in stage (E) takes place in the same way as for the above-described stage (C). As transparent formulations it is possible to use the clearcoats known in the prior art, such as 1-component clearcoats based on acrylate/melamine resins, 1-component clearcoats based on acrylate/melamine polyurethane resins, 2-component clearcoats based on acrylate/polyurethane resins, and transparent powder coating materials.

EXAMPLES

Example 1

(invention)

A Stock coating material

A1. A reaction vessel was charged with 14 parts by weight of water and 2 parts by weight of butyl glycol. 20 parts by weight of Acronal® 290 D (aqueous dispersion, solids content 50.0%) were added with stirring.

A2. To the mixture obtained in Al there was slowly added a mixture of 12 parts by weight of water and 2 parts by weight of Viscalex® HV 30 (solids content 30.6%).

A3. In a separate mixer, a mixture of 5 parts by weight of aluminum flakes and 7 parts by weight of butylglycol was stirred evenly.

With vigorous stirring, the aluminum slurry obtained in A3 was added in portions to the mixture obtained in A2.

The pH of the resultant mixture was adjusted to 7.5 using dimethylethanolamine (DMEA).

B. Crosslinker coating material 6 parts by weight of tris(methoxy,butoxy (40:60)-carbonylamino)triazine (solids content 50%, dissolved in n-butanol) were mixed with 15 parts by weight of Parocryl® AW 51.6 (polyester urethane resin, solids content 42%, dissolved in water, commercial product of the Applicant) and 10 parts by weight of water.

The mixtures obtained in A and B were mixed with one another. The viscosity of the resultant mixture was adjusted to 80 mPas/1000 s$^{-1}$ using 27 parts by weight of water and 0.3 parts by weight of Viscalex® HV 30 (solids content 30.6%) and adjustment was made to a pH of 7.5 using DMEA.

The finished coating material had a solids content of 21.9%.

Example 2

(comparative)

A Stock coating material

The stock coating material is prepared as described in Example 1.

B. Crosslinker coating material 3 parts by weight of melamine Cymel® 327 (commercial product of Cytec) were mixed with 15 parts by weight of Parocryl® AW 51.6 (polyester urethane resin, solids content 42%, dissolved in water, commercial product of BASF Coatings AG or of BASF Aktiengesellschaft) and 10 parts by weight of water.

The compositions obtained in A and B are mixed with one another. The viscosity of the resultant formulation is adjusted to 80 mPas/1000 s$^{-1}$ using 26.7 parts by weight of water and 0.3 parts by weight of Viscalex® HV 30 (solids content 30.6%) and adjustment is made to a pH of 7.5 using DMEA.

The finished coating material had a solids content of 21.95%.

The coating materials prepared in Examples 1 and 2 were applied by means of electrostatic application with a coat thickness of 15 µm to a plastics substrate coated with an air-drying pigmented water-based paint. Subsequently, electrostatic application was used to apply an aqueous slurry of transparent powder coating material with a coat thickness of 45 µm. Following initial drying at 50° C. over 10 minutes, the coats were stoved together at 150° C.

Whereas the coating produced with the basecoat of Example 1 gave a smooth and glossy film which had leveled well, that obtained with the basecoat of Example 2 exhibited mud cracking. The coating of example 2 gave a film which showed a pattern of cracks. The geometric figures produced by the cracks had an edge length of 20 mm±10.

Although there have been disclosed what are the presently preferred embodiments, persons skilled in the art will understand that variations and modifications may be made thereto without departing from the spirit or scope of the invention, as set forth in the appended claims.

What is claimed is:

1. A coating composition which comprises an aqueous polymer dispersion comprising:
   i) an acrylate polymer comprising from 30 to 60% by weight of $C_1$–$C_8$-alkyl (meth)acrylate monomers, from 30 to 60% by weight of one or more vinylaromatic monomers and from 0.5 to 10% by weight of (meth)acrylic acid;
   ii) a nonassociative rheology stabilizer comprising an acrylate copolymer comprising $C_1$–$C_6$-alkyl (meth)acrylate and (meth)acrylic acid;
   iii) as crosslinker, a compound selected from the group consisting of tris-(alkoxycarbonylamino)-triazine and a mixture of tris(alkoxycarbonylamino)-triazines.

2. The coating composition as claimed in claim 1, wherein the crosslinker is present in an amount of from 5 to 35% by weight, based on a solids content of the composition as a whole.

3. The coating composition as claimed in claim 1, wherein said component (ii) is an acrylate dispersion having a solids content of from 5 to 45% by weight.

4. The coating composition as claimed in claim 1, wherein the $C_1$–$C_8$-alkyl (meth)acrylate monomers of said component (i) is selected from the group consisting of methyl (meth)acrylate, ethyl (meth)acrylate, butyl (meth)acrylate and 2-ethylhexyl (meth)acrylate and mixtures thereof.

5. The coating composition as claimed in claim 1, wherein the vinylaromatic monomer of said component (i) is selected from the group consisting of styrene, a-alkylstyrene and vinyltoluene.

6. The coating composition as claimed in claim 1, wherein
   the acrylate copolymer of the component (ii) comprises as monomer units (meth)acrylic acid and at least two different $C_1$–$C_6$-alkyl (meth)acrylate monomers, the (meth)acrylic acid being present in an amount of from 40% by weight to 60% by weight, based on the amount of the total copolymer,
   a first $C_1$–$C_6$-alkyl (meth)acrylate monomer is present in an amount of 30% by weight to 50% by weight and
   a second $C_1$–$C_6$-alkyl (meth)acrylate monomer is present in an amount of from 1% by weight to 10% by weight based on the total amount of the acrylate copolymer.

7. A process for producing a multilayer coating on a substrate surface, comprising the steps of:
   (A) applying an aqueous coating formulation which comprises a film forming aqueous polymer dispersion as a basecoat composition to a substrate surface coated with a filler,
   (B) applying a transparent topcoat formulation to the basecoat of said step (A) and
   (C) heating the resultant basecoat together with the transparent topcoat formulation applied thereto;
      wherein said aqueous polymer dispersion comprises the aqueous polymer dispersion of claim 1.

8. A process for producing a multilayer coating on a substrate surface, comprising the steps of:
   (D) applying an aqueous film forming formulation (Y), which comprises an aqueous polymer dispersion as defined in claim 1, to a substrate surface coated with an aqueous basecoat formulation (X),
   (E) applying a transparent topcoat formulation to a resultant basecoat obtained in step (D), and
   (F) heating the basecoat formulations (X) and (Y) together with the transparent topcoat formulation applied thereto.

9. The process as claimed in claim 7, wherein the transparent topcoat formulation applied is a clearcoat selected from the group consisting of 1-component clearcoats based on acrylate/melamine resins, 1-component clearcoats based on acrylate/melamine/polyurethane resins, 2-component clearcoats based on acrylate/polyurethane resins, and transparent powder coating materials.

10. The process as claimed in claim 8, wherein the transparent topcoat formulation applied is a clearcoat selected from the group consisting of 1-component clearcoats comprising acrylate/melamine resins, 1-component clearcoats based on acrylate/melamine/polyurethane resins, 2-component clearcoats based on acrylate/polyurethane resins, and transparent powder coating materials.

11. The coating composition as claimed in claim 2, wherein said component (ii) is an acrylate dispersion having a solids content of from 5 to 45% by weight.

12. The coating composition as claimed in claim 2, wherein the $C_1$–$C_8$-alkyl (meth)acrylate monomer of said component (i) is selected from the group consisting of methyl (meth)acrylate, ethyl (meth)acrylate, butyl (meth)acrylate, 2-ethylhexyl (meth)acrylate and mixtures thereof.

13. The coating composition as claimed in claim 3, wherein the $C_1$–$C_8$-alkyl (meth)acrylate monomer of said component (i) is selected from the group consisting of methyl (meth)acrylate, ethyl (meth)acrylate, butyl (meth)acrylate, 2-ethylhexyl (meth)acrylate and mixtures thereof.

14. The coating composition as claimed in claim 2, wherein the vinylaromatic monomer of said component (i) is selected from the group consisting of styrene, a-alkylstyrene and vinyltoluene.

15. The coating composition as claimed in claim 3, wherein the vinylaromatic monomer of said component (i) is selected from the group consisting of styrene, a-alkylstyrene and vinyltoluene.

16. The coating composition as claimed in claim 4, wherein the vinylaromatic monomer of said component (i) is selected from the group consisting of styrene, a-alkylstyrene and vinyltoluene.

17. The coating composition as claimed in claim 6, wherein the (meth)acrylic acid is present in an amount of from 46% by weight to 60% by weight.

18. The coating composition as claimed in claim 6, wherein the first $C_1$–$C_6$-alkyl (meth)acrylate monomer is present in an amount of from 36% by weight to 46% by weight.

19. The coating composition as claimed in claim 6, wherein the second $C_1$–$C_6$-alkyl (meth)acrylate monomer is present in an amount of from 2% by weight to 8% by weight.

20. The coating composition as claimed in claim 2, wherein the acrylate copolymer of the component (ii) comprises as monomer units (meth)acrylic acid and at least two different $C_1$–$C_6$-alkyl (meth)acrylate monomers, the (meth)acrylic acid being present in an amount of from 40% by weight to 60% by weight based on the amount of an overall amount of the acrylate copolymer, and a first $C_1$–$C_6$-alkyl (meth)acrylate monomer being present in an amount of 30% by weight to 50% by weight, and a second $C_1$–$C_6$-alkyl (meth)acrylate monomer being present in an amount of from 1% by weight to 10% by weight based on the total amount of the acrylate copolymer.

* * * * *